(12) United States Patent
Stroefer et al.

(10) Patent No.: US 7,414,159 B2
(45) Date of Patent: Aug. 19, 2008

(54) SEPARATION OF LIQUID MIXTURES IN A FILM EVAPORATOR

(75) Inventors: Eckhard Stroefer, Mannheim (DE); Neven Lang, Mannheim (DE); Ute Lichtfers, Karlsruhe (DE); Ulrich Steinbrenner, Neustadt (DE); Hans Hasse, Kaiserslautern (DE)

(73) Assignee: BASF SE, Ludwigshafen (DE)

( * ) Notice: Subject to any disclaimer, the term of this patent is extended or adjusted under 35 U.S.C. 154(b) by 224 days.

(21) Appl. No.: 10/547,733

(22) PCT Filed: Mar. 3, 2004

(86) PCT No.: PCT/EP2004/002122

§ 371 (c)(1),
(2), (4) Date: Sep. 2, 2005

(87) PCT Pub. No.: WO2004/078307

PCT Pub. Date: Sep. 16, 2004

(65) Prior Publication Data

US 2007/0106096 A1 May 10, 2007

(30) Foreign Application Priority Data

Mar. 4, 2003 (DE) ................ 103 09 392

(51) Int. Cl.
*C07C 41/18* (2006.01)
(52) U.S. Cl. ................ 568/621; 568/679; 568/699
(58) Field of Classification Search ................ 568/621
See application file for complete search history.

(56) References Cited

U.S. PATENT DOCUMENTS

| | | | |
|---|---|---|---|
| 2,042,451 A * | 6/1936 | Bond et al. | 423/373 |
| 2,581,881 A | 1/1952 | Pyle et al. | |
| 3,426,041 A | 2/1969 | Miyake et al. | |
| 6,193,504 B1 * | 2/2001 | Chen et al. | 432/72 |
| 6,610,865 B2 * | 8/2003 | Hofen et al. | 549/531 |
| 6,610,888 B1 | 8/2003 | Ströfer et al. | |
| 2004/0156762 A1 | 8/2004 | Schuppich et al. | |

FOREIGN PATENT DOCUMENTS

| | | |
|---|---|---|
| DE | 1 260 143 | 2/1968 |
| DE | 1 291 747 | 4/1969 |
| DE | 199 25 870 | 12/2000 |
| DE | 100 36 602 A1 | 2/2002 |
| GB | 1002269 | 8/1965 |
| GB | 1048191 | 11/1966 |
| WO | WO 03/038363 A2 * | 5/2003 |
| WO | WO-2004/036137 A2 | 4/2004 |

OTHER PUBLICATIONS

Derwent 68-99505P, Paraformaldehyde Production, Mar. 21, 1962.
Derwent 2004-366051, Process and apparatus for Industrial Scale Evaporation, Apr. 29, 2004.

* cited by examiner

*Primary Examiner*—Rosalynd Keys
(74) *Attorney, Agent, or Firm*—Connolly Bove Lodge & Hutz LLP

(57) ABSTRACT

A liquid mixture comprising at least one readily volatile and at least one sparingly volatile component is separated in a film evaporator by a process in which
(i) a continuous stream of a liquid starting material mixture is provided,
(ii) a liquid film is produced from the continuous stream and is brought into contact with a heat exchange surface of the Mm evaporator,
(ii) the liquid film is partly evaporated, a gas stream enriched with the at least one readily volatile component and a liquid stream enriched with the at least one sparingly volatile component being obtained,
wherein
(iv) the heat exchange surface is coated with a catalytically active material which
(v) catalyzes, in the liquid film, a chemical reaction in which at least one readily volatile component is formed.

8 Claims, 2 Drawing Sheets

SEPARATION OF LIQUID MIXTURES IN A FILM EVAPORATOR

Figure 1:
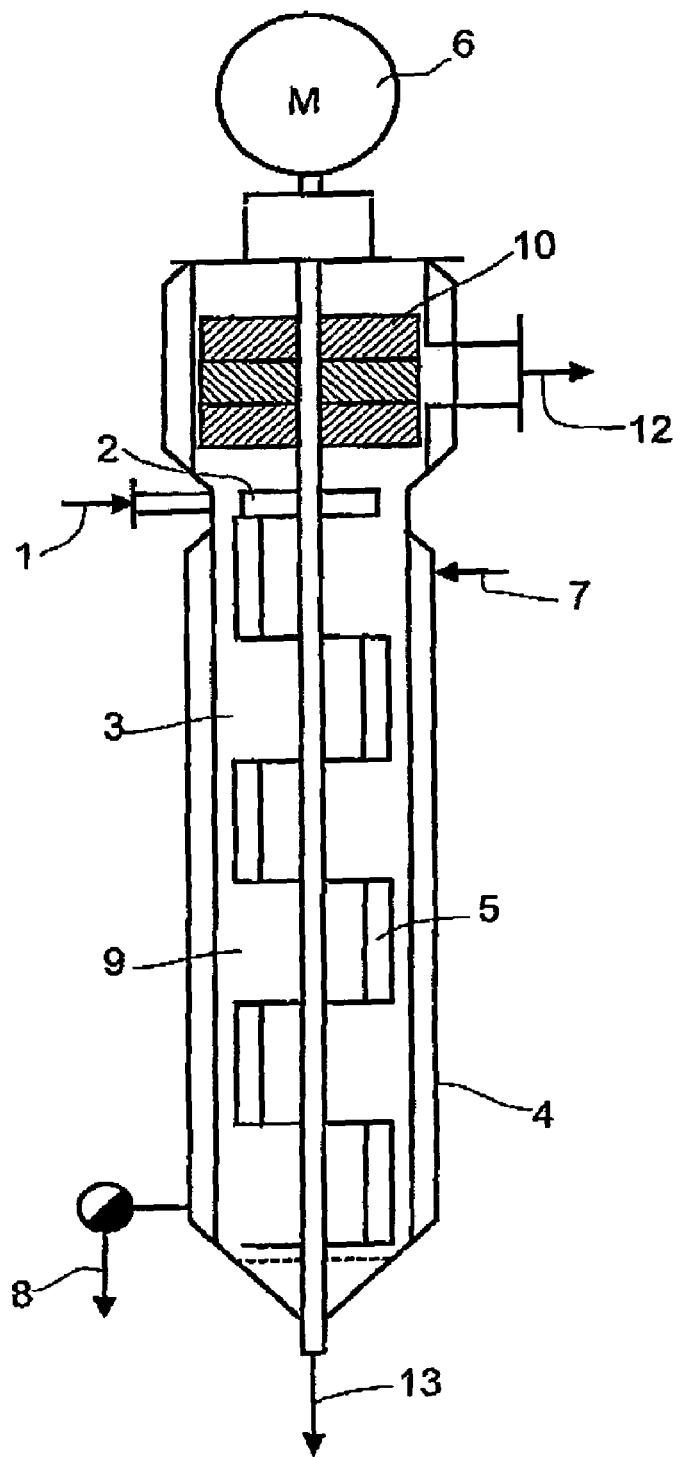

This application is a National Stage of PCT/EP2004/002122 filed Mar. 3, 2004 which in turn claims priority from German Application 103 09 392.3 filed Mar. 4, 2003.

The invention relates to a process for separating liquid mixtures in a film evaporator, in particular for separating liquid mixtures of polyoxymethylene glycols.

Formaldehyde is an important industrial chemical and is used for the production of numerous industrial products and consumer articles. Formaldehyde is currently used in over 50 branches of industry, substantially in the form of aqueous solutions or formaldehyde-containing synthetic resins. Commercially available, aqueous formaldehyde solutions have total concentrations of from 20 to 55% by weight of formaldehyde in the form of monomeric formaldehyde, methylene glycol and oligomeric polyoxymethylene glycols.

Water, monomeric (free) formaldehyde, methylene glycol and oligomeric polyoxymethylene glycols of different chain length are present in aqueous solutions alongside one another in thermodynamic equilibrium, which is characterized by a certain distribution of the polyoxymethylene glycols of different length. The term aqueous formaldehyde solution also refers to formaldehyde solutions which contain virtually no free water but substantially only water chemically bonded in the form of methylene glycol or in the terminal OH groups of the polyoxymethylene glycols. This is the case in particular for concentrated formaldehyde solutions. Polyoxymethylene glycols may have, for example, from two to nine oxymethylene units. Dioxymethylene glycol, trioxymethylene glycol, tetraoxymethylene glycol, pentaoxymethylene glycol, hexaoxymethylene glycol, heptaoxymethylene glycol, octaoxymethylene glycol and nonaoxymethylene glycol may therefore be present alongside one another in aqueous formaldehyde solutions. The distribution is concentration-dependent. Thus, the maximum distribution in dilute formaldehyde solutions is located at homologs of small chain length whereas in concentrated formaldehyde solutions it is located at homologs of greater chain length. An equilibrium shift toward longer-chain (higher molecular weight) polyoxymethylene glycols can result from the removal of water, for example by simple distillation in a film evaporator. The equilibrium is established at a finite rate by the intermolecular condensation of methylene glycol and low molecular weight polyoxymethylene glycols with elimination of water to give higher molecular weight polyoxymethylene glycols.

In addition, aqueous formaldehyde solutions frequently also contain secondary components. For example, methanol may be present in concentrations of several % by weight. This methanol may present problems in subsequent reactions of the formaldehyde and must therefore be virtually completely separated off. With methanol methylene glycol, the simplest hydrated formaldehyde, now forms an acetal(methylal), which is the most readily volatile component in the entire system comprising formaldehyde, water, methylene glycol hemiacetal and methylene glycol acetal. Methanol can therefore be removed as methylene glycol acetal from the aqueous formaldehyde solution by evaporation. The equilibrium between methylene glycol methanol, methylene glycol hemiacetal and methylene glycol acetal is established at a finite rate and can be accelerated by catalysis.

For certain chemical syntheses with the use of formaldehyde, it is furthermore desirable to use formaldehyde solutions having a certain molecular weight distribution of the polyoxymethylene glycols contained therein. For example, it was found that a formaldehyde solution can be transferred directly to a polycondensation for the preparation of oxymethylene homo- or copolymers if the molar ratio of polyoxymethylene glycols to monomeric formaldehyde and methylene glycol is greater than 1:0.6, preferably greater than 1:0.4. In the preparation of methylenedi(phenylamine) from aniline and formaldehyde, it is desirable to add the formaldehyde in the form of the higher homologs in order to suppress the formation of the undesired byproduct N-methyl-MDA. For the preparation of trioxane and tetraoxane by cyclization, formaldehyde fractions having a high content of trioxymethylene glycol and tetraoxymethylene glycol are desirable. Furthermore, in syntheses which require the use of aqueous formaldehyde solutions, it is desirable to reduce the water load by using very highly concentrated aqueous formaldehyde solutions.

These high concentrations can be achieved by removing water continuously from the system, water continuously reforming as a result of condensation of polyoxymethylene glycols, and the polyoxymethylene glycol chains growing. The condensation reaction can be accelerated catalytically.

It is an object of the present invention to provide a simple process by means of which it is possible to obtain formaldehyde solutions which have a high formaldehyde concentration and/or also have a specific distribution of polyoxymethylene glycols. It is a further object of the present invention to provide a simple process by means of which methanol can be virtually completely separated from an aqueous formaldehyde solution.

We have found that this object is achieved by a process for separating a liquid mixture comprising at least one readily volatile and at least one sparingly volatile component in a film evaporator, in which (i) a continuous stream of a liquid starting material mixture is provided, (ii) a liquid film is produced from the continuous stream and is brought into contact with a heat exchange surface of the film evaporator, (iii) the liquid film is partly evaporated, a gas stream enriched with readily volatile components and a liquid stream enriched with sparingly volatile components being obtained, wherein (iv) the heat exchange surface is coated with a catalytically active material which (v) catalyzes, in the liquid film, a chemical reaction in which at least one readily volatile component is formed.

The liquid mixture to be separated contains at least one readily volatile and at least one sparingly volatile component. The terms readily volatile and sparingly volatile used above have no absolute meaning but a relative one. Readily volatile means readily volatile relative to the sparingly volatile component or components, and vice versa The boiling points of the readily volatile and of the sparingly volatile components are in general so far apart that a significant enrichment of the readily volatile component in the gas phase relative to the liquid phase takes place merely by simple evaporation.

The readily volatile component or components or the sparingly volatile component or components may be present in the starting material mixture fed to the film evaporator or may be formed only during the catalyzed chemical reaction. All possible reactor types in which a sparingly volatile substance reacts to give one or more readily volatile substances or to give a sparingly volatile and a readily volatile substance, for example (in a monomolecular manner) by elimination, fragmentation, rearrangement and degradation reactions, are conceivable, provided that the starting material and/or the products formed has or have a sufficient difference between their relative volatilities in the relevant mixture. One or more different substances may also react (in a biomolecular manner) with liberation of a readily volatile substance to give a sparingly volatile substance, for example by condensation or oligomerization.

The novel coupling of chemical reaction and evaporation of resulting readily volatile components in a film evaporator has a number of advantages.

By removing readily volatile components formed during the chemical reaction from the chemical equilibrium, the latter is shifted to the product side. As a result of the catalytic coating of the heat exchanger wall, the (new) equilibrium state is rapidly established.

Rapid removal of readily volatile components formed during the reaction from the liquid mixture may also be desirable when they undergo, for example with starting materials of the reaction, subsequent reactions which reduce the selectivity of the reaction or lead to the formation of undesired byproducts.

The separation of the liquid mixture is carried out in a film evaporator.

Film evaporators have very good heat transfers since the ratio of reaction volume to heat exchange surface is low. Consequently, a quasiisothermal reaction and a uniform temperature distribution (avoidance of temperature gradients) in the reaction mixture are possible. This is advantageous particularly when undesired parallel or subsequent reactions are promoted by temperature increase in the reaction mixture.

In film evaporators, it is possible to realize short residence times in combination with narrow residence time distributions, provided that they are not operated with a circulation. Narrow residence time distributions are advantageous in particular when the resulting products of the chemical reaction can undergo undesired subsequent reactions.

Suitable designs for the film evaporator used according to the invention are, for example, the falling-film evaporator, the thin-film evaporator and the helical-tube evaporator and combinations of said apparatuses.

In the film evaporators used according to the invention, coated wall segments can alternate with uncoated wall segments.

The present invention also relates to the film evaporators themselves which have a heat exchanger wall coated with catalytically active material.

In an embodiment of the novel process
the liquid starting material mixture is an aqueous formaldehyde solution,
the readily volatile components are free formaldehyde ($CH_2O$), methylene glycol ($HOCH_2OH$) and water,
the sparingly volatile components are selected from the group consisting of polyoxymethylene glycols (HO$(CH_2O)_nH$) having from 2 to 20 oxymethylene units (n=2-20),
the catalyzed chemical reaction is the acid- or base-catalyzed condensation of methylene glycol and polyoxymethylene glycols, low molecular weight polyoxymethylene glycols reacting to give higher molecular weight polyoxymethylene glycols, and water being formed as a readily volatile component.

By the evaporation of water, but also of methylene glycol and free formaldehyde, from the aqueous formaldehyde solution, a nonequilibrium distribution of the oligomeric polyoxymethylene glycols in the solution is produced. The coating of catalytically active material on the heat exchange surface catalyzes the condensation reaction, which takes place with elimination of further water, with the result that the distribution of the polyoxymethylene glycols in the solution is shifted toward the equilibrium distribution. A distribution of the polyoxymethylene glycols in the (concentrated) solution is thus achieved, which distribution is at least closer to the equilibrium distribution than would be the case without the presence of catalytically active material. The extent of the condensation reaction can be controlled by the evaporation rate, the acid strength of the catalyst and the residence time of the solution in the evaporator.

In a further embodiment of the novel process
the liquid starting material mixture is a solution comprising water, formaldehyde in its hydrated form (methylene glycol), its hemiacetal and acetal with methanol and methanol itself,
the readily volatile component is methylene glycol/the full acetal of methanol (methylal),
the sparingly volatile components are the other components,
the catalyzed chemical reaction is the formation of methylal in each case from methylene glycol or methylene glycol/the hemiacetal of methanol, and methanol.

Suitable catalysts are, for example, acidic catalysts. The process can be used for separating methanol in aqueous formaldehyde solutions. However, it can also be used for the targeted preparation of methylal from formaldehyde and methanol. From methylal in turn, it is possible to obtain highly concentrated formaldehyde.

Suitable catalytically active materials are in principle all materials which catalyze the abovementioned chemical reactions. In the case of the oligomerization of formaldehyde, these are materials having acidic or basic properties, preferably having acidic properties. For example, films of acidic ion exchange material, as used, for example, as ion-selective membranes for the preparation of NaOH and HCl from NaCl by water elimination, can be employed. The ion exchange material is preferably a sulfonated styrene/divinylbenzene copolymer or a perfluorinated polymer of the Nafion® type which contains bound acidic groups. Such films can be adhesively bonded to the heat exchange surface of the film evaporator, held by means of reduced pressure, mechanically fastened or polymerized directly onto the heat exchange surface.

Suitable catalytically active materials having acidic properties are composites of a porous or gel-like polymer and particles of heterogeneous acids. Preferred heterogeneous acids are zeolites, such as chabasite, mazzite, erionite, ferrierite, faujasite, zeolite L, mordenite, offretite, zeolite rho, ZBM-10, ZSM-5, ZSM-12, MCM-22 and zeolite beta, and furthermore clays, in particular montmorillonite, muscovite, kaolinite and the acid-activated forms thereof, acidic mixed oxides, in particular $WO_3$—$TiO_2$, $MoO_3$—$TiO_2$, $MoO_3$—$ZrO_2$, $Al_2O_3$—$SiO_2$, $ZrO_2$—$SiO_2$, $TiO_2$—$SiO_2$, $TiO_2$—$ZrO_2$ and niobic acid, and furthermore $SiO_2$-sulfonic acid composites of the Deloxan® type and sulfonated, oxidized active carbon.

It is also possible to coat the heat exchange surface of the novel film evaporator without adhesive or polymeric binders. Oxidic top layers perform the binding function, acidic oxides being bonded to said layers directly via metal-oxygen bonds. Suitable processes are described in J. Yamazaki, K. Tsutsumi, Micropor. Mat. 5 (1995), 245 et seq., O. L. Oudshoorn et al., Chem. Eng. Sci. 54 (1999), 1413 et seq., DE-A 196 07 577 and DE-A 42 16 846. Thus, large zeolite or zeolite-analogous molecular sieve crystals having a particle size of, for example, from 3 to 500 µm can be fixed on the heat exchange surface by heating said surface to the softening temperature and continuously adjusting the preheated surface with flowable powder of the crystals. The crystals adhere to the softened surface in a thin layer of, for example, from one to 5 crystals deep and, after cooling of the surface, are permanently fixed thereto. In order to produce particularly hard coatings, the heat exchange surface can also be pretreated with an adhesion promoter prior to dusting.

Furthermore, the heat exchange surface of the film evaporator can be coated with macroscopic elements, such as cylinders, cylinder segments ox plates of heterogeneous acids. These elements are produced by pressing, casting or extrusion, adhesively bonded or sintered and then adhesively bonded, screwed, riveted or otherwise mechanically fixed to the heat exchange surface.

That heat exchange surface of the novel film evaporator which is coated with catalytically active material is the total available heat exchange surface or only a part thereof. For example, coated and uncoated segments of the heat exchange surface may alternate.

A film evaporator which is particularly suitable for the process described is shown in FIG. 1. It is a thin-film evaporator. The feed 1, consisting of crude solution (starting material mixture) and, if required, recycled stream, is first fed to a liquid distributor 2. This distributes the crude solution over an evaporator surface 3. The evaporator surface 3 (heat exchange surface) is usually cylindrical but may also have a conical shape at least in part. Depending on the application, it may consist, for example, of glass, metal, plastics or ceramic and either itself have catalytic properties or be catalytically coated or be doped with catalytically active substances. It is in thermal contact with the inside of a heating jacket 4 which ensures a heat supply to the evaporator surface 3. The liquid distributor 2 helps to ensure that the feed solution is uniformly distributed over the circumference of the evaporator surface 3.

Rotating wiper blades 5 then distribute the solution further over the evaporator surface 3, ensure maintenance and transport of a liquid film on the evaporator surface 3 and help to intensify the heat transport and mass transfer in the liquid. These wiper blades 5 are mounted rigidly or movably on a rotor which is driven by a drive apparatus 6. Depending on the design and positioning of the wiper blades 5, the liquid film can be kept thin or can be backed up. A change in the residence time or in the residence time distribution of the solution in the film evaporator is thus possible. The typical residence time of the solution in the film evaporator is from 1 second to 10 minutes, preferably from 2 seconds to 2 minutes.

A heating medium, e.g. steam, is fed into the hearing jacket through a heating medium feed 7. Said heating medium heats the evaporator surface. Cooled heating medium, e.g. condensed water where the heating medium used is steam, is removed via the heating medium discharge 8.

Through the heat supply to the evaporator surface 3, a part of the solution fed to the film evaporator is evaporated, with the result that the unevaporated part of the solution changes in its composition. The catalytically active coating of the evaporator surface catalyzes chemical reactions of the components of the mixture, which are superposed on the evaporation process and lead to an increased yield of the desired component.

The resulting vapor (i.e. steam or gases) passes into a phase separation space 9 and from there into a mist collector 10. Liquid droplets entrained with the vapor are removed here from the gas phase and recycled to the liquid (solution). The concentrate 13 is discharged from the phase separation space 9 in a suitable manner, while the vapor 12 is taken off from the mist collector 10. The vapor is passed into a condenser which is not shown, where it is at least partly condenses to give a condensate.

Gas phase and liquid phase can be passed countercurrently, as shown in FIG. 1. However, they can also be passed cocurrently.

If an aqueous formaldehyde solution is introduced into the film evaporator described, the polyoxymethylene glycols accumulate in the liquid 13, while the condensate of the vapor 12 is low in polyoxymethylene glycols and rich in formaldehyde and methylene glycol. In this way, two fractions, i.e. concentrate 13 and (partial) condensate of the vapor 12, are formed, in which certain components of the originally introduced crude solution 1 have been selectively concentrated. In the case of the preparation of methylal, the latter accumulates in the vapor.

In a particular embodiment, the condenser can be integrated in the evaporator body, resulting in a shorter residence time of the evaporated components in the vapor phase and a more compact design.

Suitable operating conditions for the film evaporator are in general a temperature of from 10 to 200° C., preferably from 50 to 150° C., at an absolute pressure of from 0.5 mbar to 20 bar, preferably from 30 mbar to 2 bar.

In addition to the film evaporator design shown in FIG. 1, it is also possible to use an apparatus without mechanical influencing of the liquid film on the evaporation surface. The heat transfer surface of this falling-film or downstream evaporator can be in the form of tubes, plates or a helical tube (spiral tube).

Figure 2:
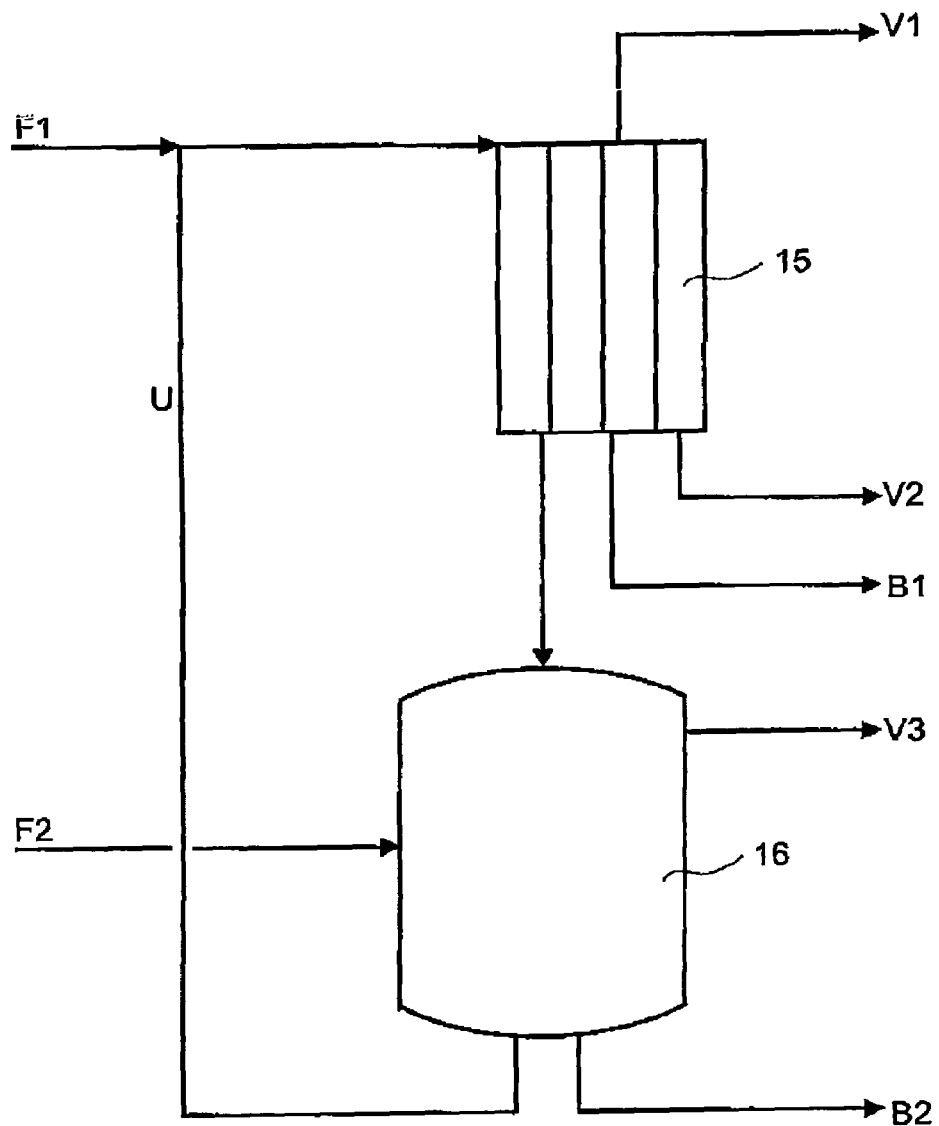

Depending on the specific process requirements, a film evaporator can be used in various modes of operation. FIG. 2 shows a schematic overview of the possible modes of operation. Here, the actual film evaporator is denoted by 15 and a vapor separator (i.e. phase separation space with mist collector) is denoted by 16. Both the film evaporator 15 and the vapor separator 16 may differ from the specific design as shown in FIG. 1 and may have further feeds and discharges in comparison with FIG. 1. V1, V2 and V3 denote vapor streams, and all other streams are usually liquid.

The film evaporator 15 can be operated with a single pass or by a circulation procedure with regard to the unevaporated liquid emerging. The circulation U is technically necessary for operation by a circulation procedure.

The table below shows the active streams for the modes of operation possible in each case.

|  | F1 | F2 | B1 | B2 | V1 | V2 | V3 | U |
|---|---|---|---|---|---|---|---|---|
| Single pass, vapor and liquid in countercurrent flow | X |  |  | X | X |  |  |  |
| Single pass, vapor and liquid in cocurrent flow | X |  |  | X |  | X |  |  |
| Circulation procedure, feed in circulation, vapor and liquid in cocurrent flow | X |  |  | X |  | X |  | X |
| Circulation procedure, feed in circulation, vapor and liquid in countercurrent flow | X |  |  | X | X |  |  | X |
| Circulation procedure, feed in vapor separator, vapor and liquid in cocurrent flow |  |  | X | (X) | X |  | X | (X) | X |
| Circulation procedure, feed in vapor separator, vapor and liquid in countercurrent flow |  |  | X |  | X | X |  | (X) | X |

The film evaporator may have, at a suitable point, side take-offs via which liquid fractions having a certain degree of enrichment can be removed. It is also possible to connect a plurality of film evaporators in series to form an evaporator cascade, the liquid, concentrated discharge of one film evaporator, if necessary after removal of a side stream, forming the feed for the next film evaporator of the evaporator cascade.

It is also possible to introduce into the film evaporator, countercurrently to the liquid stream, a reactive gaseous component which reacts with one or more components of the liquid starting material mixture or one or more of the sparingly volatile components formed. Thus, the resulting sparingly volatile components in the outflowing liquid film in the lower part of the film evaporator can undergo subsequent reactions with the components contained in the ascending gas stream. The heat exchange surface can be coated with catalytically active material which catalyzes these subsequent reactions of the one or more sparingly volatile components formed. This catalytically active material may differ from the catalytically active material which catalyzes the formation of the sparingly volatile components. It may also be the same catalytically active material. Different catalytically active materials may be present in different segments of the heat exchange surface.

For example, a reactive gaseous starting material may be introduced into the evaporator countercurrently to the direction of flow of the liquid film on the heat exchanger wall and cocurrently with evaporating water, formaldehyde and methylene glycol. Said starting material then reacts with the polyoxymethylene glycols to give (sparingly volatile) products which run out at the bottom of the evaporator. The evaporator may then have, for example, segments which are coated with an acidic or basic material for catalyzing the condensation reaction and may have segments which are coated with a catalytically active material for catalyzing the subsequent reaction of the polyoxymethylene glycols.

Examples of such reactions are the reaction of acetylene with formaldehyde solution in a Reppe reaction to give butynediol, which can be further hydrogenated to butanediol;

aldolization reactions of formaldehyde with itself or higher aldehydes to give polyhydric alcohols and sugars, pentaerythritol, trimethylolpropane and neopentyl glycol;

the reaction of formaldehyde and CO to give glycolic acid;

the preparation of chelating substances, such as glycol nitriles from solutions of formaldehyde;

the reaction of formaldehyde with olefins in a Prins reaction to give alpha-hydroxymethyl compounds;

condensation reactions of formaldehyde with amines, such as aniline or toluidine, to give Schiff's bases, which can be farther reacted to give diphenylmethane derivatives, such as methanediphenyldiamine;

reaction of hydroxylamine with formaldehyde to give oximes;

reaction of formaldehyde with diols to give cyclic ethers, for example of glycol and formaldehyde to give dioxolane;

reaction of formaldehyde with alcohols to give ethers, such as polyoxymethylene dialkyl ether, preferably polyoxymethylene dimethyl ether.

The list is not complete. Text books of organic chemistry and of industrial chemistry contain further example reactions. However, the list is intended by way of example to illustrate the industrial importance of formaldehyde as a synthesis building block in the entire area of organic chemistry. This applies both to low-tonnage intermediates in the pharmaceutical or crop protection sector, e.g. oximes, and to high-tonnage products, such as diphenylmethane derivatives and polyoxymethylene dialkyl ethers.

The example which follows illustrates the invention.

EXAMPLE 500 ml/h of an aqueous formaldehyde solution comprising 5% by weight of formaldehyde, 55% by weight of water and 40% by weight of methanol are introduced into the top of a laboratory thin-film evaporator heated from the outside with liquid. The heating jacket temperature of the thin-film evaporator is brought to 100° C. and the pressure in the interior to 200 mbar, The evaporation rate is 2.33.

The inside of the evaporator tube is coated with a strongly acidic ion exchange resin having a capacity of 5.2 mol H$^+$/kg. The wiper operates at 600 rpm and performs the function of distributing the inflowing solution homogeneously over the inside of the evaporator tube. The wiped length of the thin-film evaporator used is 300 mm and the internal diameter of the evaporator tube is 50 mm. The evaporator itself is produced from high-quality stainless steel.

The acid-catalyzed reaction of the formaldehyde and methanol to give methylal according to the equation

takes place on the inner wall.

The methylal formed is evaporated off continuously together with water and methanol, passed via the top and condensed in the downstream condenser. The proportion of methylal in the condensed gas phase is 13.0% by weight. The bottom product contains only traces of methylal. The conversion of formaldehyde is over 80%.

We claim:

1. A process for separating a liquid mixture comprising at least one readily volatile and at least one sparingly volatile component in a film evaporator, in which
   (i) a continuous stream of a liquid staffing material mixture is provided,
   (ii) a liquid film is produced from the continuous stream and is brought into contact with a heat exchange surface of the film evaporator,
   (iii) the liquid film is partly evaporated, a gas stream enriched with the at least one readily volatile component and a liquid stream enriched with the at least one sparingly volatile component being obtained,
   wherein
   (iv) the heat exchange surface is coated with a catalytically active material which
   (v) catalyzes, in the liquid film, a chemical reaction in which at least one readily volatile component is formed,
   wherein the liquid staffing material mixture is an aqueous formaldehyde solution, the readily volatile components are selected from the group consisting of free formaldehyde (CH$_2$O), methylene glycol (HOCH$_2$OH) and water, the sparingly volatile components are selected from the group consisting of polyoxymethylene glycols (HO(CH$_2$O)$_n$H) having from 2 to 20 oxymethylene units (n=2–20), and the catalyzed chemical reaction is the acid- or base-catalyzed condensation of methylene glycol and polyoxymethylene glycols, higher molecular weight polyoxymethylene glycols being formed from low molecular weight polyoxymethylene glycols and water being formed as a readily volatile component, wherein the catalytically active material is an ion exchange material or a composite of a porous or gel-like polymer and a zeolite.

2. A process as claimed in claim 1, wherein the film evaporator is in the form of a falling-film evaporator, thin-film evaporator, helical-tube evaporator or a combination of these apparatuses.

3. A process as claimed in claim 1, wherein the catalytically active material has acidic properties.

4. A process as claimed in claim 1, wherein the heat exchange surface has coated and uncoated segments.

5. A process for separating a liquid mixture comprising at least one readily volatile and at least one sparingly volatile component in a film evaporator, in which
(i) a continuous stream of a liquid staffing material mixture is provided,
(ii) a liquid film is produced from the continuous stream and is brought into contact with a heat exchange surface of the film evaporator,
(iii) the liquid film is partly evaporated, a gas stream enriched with the at least one readily volatile component and a liquid stream enriched with the at least one sparingly volatile component being obtained,
wherein
(iv) the heat exchange surface is coated with a catalytically active material which
(v) catalyzes, in the liquid film, a chemical reaction in which at least one readily volatile component is formed, wherein the catalytically active material is an ion exchange material or a composite of a porous or gel-like polymer and a zeolite.

6. A process as claimed in claim 5, wherein the film evaporator is in the form of a falling-film evaporator, thin-film evaporator, helical-tube evaporator or a combination of these apparatuses.

7. A process as claimed in claim 5, wherein the heat exchange surface has coated and uncoated segments.

8. A process as claimed in claim 5, wherein a reactive gaseous component is introduced into the film evaporator countercurrently to the liquid stream, which gaseous component reacts with one or more components of the liquid staffing material mixture or one or more of the sparingly volatile components formed.

* * * * *

UNITED STATES PATENT AND TRADEMARK OFFICE
CERTIFICATE OF CORRECTION

PATENT NO. : 7,414,159 B2
APPLICATION NO. : 10/547733
DATED : August 19, 2008
INVENTOR(S) : Eckhard Ströfer et al.

It is certified that error appears in the above-identified patent and that said Letters Patent is hereby corrected as shown below:

On the title page:

In the Abstract, section (57), line 8 reads "Mm evaporator,", it should read -- film evaporator, --.

Signed and Sealed this

Second Day of December, 2008

JON W. DUDAS
*Director of the United States Patent and Trademark Office*